United States Patent [19]

Ottusch

[11] Patent Number: 4,982,082

[45] Date of Patent: Jan. 1, 1991

[54] FREQUENCY DETECTOR FOR DISCRIMINATING MULTI-LONGITUDINAL MODEL LASER OPERATION

[75] Inventor: John J. Ottusch, Malibu, Calif.

[73] Assignee: Hughes Aircraft Company, Los Angeles, Calif.

[21] Appl. No.: 440,009

[22] Filed: Nov. 21, 1989

[51] Int. Cl.$^5$ .............................................. H01J 40/14
[52] U.S. Cl. ................................. 250/214 R; 455/609
[58] Field of Search ....................... 250/214 R, 214 A; 455/609, 611, 619

[56] References Cited

U.S. PATENT DOCUMENTS 4,594,511  6/1986  Cooper et al. ...................... 356/318
4,863,272  9/1989  Coccoli ............................. 356/350

OTHER PUBLICATIONS

Donald C. O'Shea et al., "An Introduction to Lasers and Their Applications", Addison–Wesley Publishing Company, Chap. 5, pp. 107–124 (1978).

Primary Examiner—David C. Nelms
Assistant Examiner—Khaled Shami
Attorney, Agent, or Firm—V. D. Duraiswamy; P. M. Coble; W. K. Denson-Low

[57] ABSTRACT

A photodetector produces an output signal in response to irradiation by an optical beam from a pulsed laser. A delay unit delays the output signal for a period corresponding to one-half of one cycle of a beat frequency generated by interaction of two frequency components in the optical beam corresponding to two predetermined longitudinal modes of operation of the laser. A differential mixer subtractively combines the output of the photodetector with the output of the delay unit, to produce an output signal having the main profile of the laser pulses suppressed, and the beat frequency component, if present, amplified. A resonant circuit and amplifier may be provided to further amplify the beat frequency component. The output of the amplifier is integrated to produce a DC signal having a magnitude which corresponds to the amplitude of the beat frequency component. The DC signal is compared with a threshold value to discriminate between single and multimode operation of the laser. An optical shutter may be closed in response to sensed multi-longitudinal mode operation to block the laser beam and protect equipment which would otherwise be damaged thereby.

33 Claims, 4 Drawing Sheets

FREQUENCY DETECTOR FOR DISCRIMINATING MULTI-LONGITUDINAL MODEL LASER OPERATION

This invention was made with U.S. Government support pursuant to Contract No. N00014-87-C-0090, awarded by the Department of the Navy. The U.S. Government has certain rights in this invention.

BACKGROUND OF THE INVENTION

1. Field of the Invention

The present invention relates to a frequency detector for detecting the pressence of a predetermined frequency component in an electrical signal. The invention is especially suited for discriminating between single longitudinal mode (SLM) and multi-longitudinal mode (MLM) operation of a pulsed laser.

2. Description of the Related Art

Pulsed lasers generate coherent light beams by optical resonance in a suitable material. An output beam may be produced when the amplitude of optical oscillation in the material exceeds the losses therein. Although oscillation in a single longitudinal mode is desirable in most laser applications, relatively elaborate steps must be taken in the design of a particular laser to suppress oscillation in longitudinal modes other than the desired one. Oscillation in each longitudinal mode occurs at a frequency which is different from oscillation in the other modes.

A discussion of multiple longitudinal modes of oscillation in a laser cavity, as well as methods proposed to achieve single longitudinal mode operation, is found in a textbook entitled "An Introduction to Lasers and Their Operation", by D. O'Shea et al, Addission-Wesley Publishing Company, Chapt. 5, pp. 107-124 (1978).

Lasers which operate consistently in SLM are expensive to produce on a commercial production basis. Even intricate, well designed lasers adapted to suppress MLM operation generate a certain proportion of multimode pulses due to thermal noise and unpredictable changes in ambient conditions.

Pulsed SLM lasers are used extensively for scientific research in numerous technical fields. Often, a material will be irradiated with one or more laser pulses to observe and measure the effects of the radiation on the material. Various materials are affected differently by SLM and MLM pulses. In order to correctly identify and quantify the irradiation effects, it is necessary to discriminate between the results produced by SLM pulses and occasional MLM pulses. This has been accomplished in the past by connecting a high speed oscilloscope to the output of a photodetector which is irradiated by a portion of the laser beam. The temporal shape or profile of an SLM pulse is smooth, whereas one or more beat frequency components are superposed on the profile of an MLM pulse. Each beat frequency component is produced by interaction of two longitudinal oscillation mode frequencies at the difference therebetween. The researcher is able to visually distinguish MLM pulses from SLM pulses by their different shapes. However, this can be quite awkward, especially where the researcher is attempting to observe the effects of the pulses on the material being investigated in addition to the shape of the pulse on the oscilloscope, and is practically impossible at a pulse rate of more than two or three pulses per second. Applications requiring high power laser beams generally employ amplifiers for increasing the power level of a beam generated by a relatively small source laser. These amplifiers often include elements which are quite large and expensive, and are operated just below their material damage threshold for maximum efficiency. Whereas the damage threshold is not exceeded by SLM pulses, the interactive combination of frequency components in an MLM pulse can result in a composite pulse amplitude which exceeds the threshold. The result is catastrophic failure of the amplifier element.

SUMMARY OF THE INVENTION

The present invention provides a frequency detector which is especially suitable for discriminating between SLM and MLM operation of a laser. However, the detector may be adapted for use in any application in which it is desired to detect the presence pressure or absence of a predetermined frequency component in a composite electrical signal which includes at least one other frequency component. In an exemplary scientific application where the detector is employed to discriminate between SLM and MLM operation of a laser used to irradiate a material under investigation, the output of the detector may be connected to an input of a device such as a computer which is used to record measurements or readings obtained from a sensor employed to sense the response of the material to the pulses. The sensor is connected to another input or data channel of the recording device. This provides automatic correlation of the readings from the sensor with the type of pulse with which the material was irradiated to produce the reading.

The invention enables a decision as to whether a pulse is SLM or MLM to be made, and an action taken as a result of the decision, in a time frame which is muCh shorter than would be possible using manual intervention.

In accordance with the present invention, a photodetector produces an output signal in response to irradiation by an optical beam from a pulsed laser. A delay unit delays the output signal for a period corresponding to onehalf of one cycle of a beat frequency generated by interaction of two frequency components in the optical beam corresponding to two predetermined longitudinal modes of operation of the laser. A differential mixer subtractively combines the output of the photodetector with the output of the delay unit, to produce an output signal having the main profile of the laser pulses suppressed, and the beat frequency component, if present, amplified. A resonant circuit and amplifier may be provided to further amplify the beat frequency component. The output of the amplifier is integrated to produce a DC signal having a magnitude which corresponds to the amplitude of the beat frequency component. The DC signal is compared with a threshold value to discriminate between single and multi-mode operation of the laser. An optical shutter may be closed in response to sensed multi-longitudinal mode operation to block the laser beam and protect equipment which would otherwise be damaged thereby.

These and other features and advantages of the present invention will be apparent to those skilled in the art from the following detailed description, taken together with the accompanying drawings, in which like reference numerals refer to like parts.

DETAILED DESCRIPTION OF THE INVENTION

Lasers which operate in multiple longitudinal modes generate optical beams which include a frequency component corresponding to each longitudinal mode of oscillation. Generally, there is a dominant mode of oscillation which produces the single frequency present in SLM operation. The main frequency component has the highest amplitude, whereas the frequency components corresponding to the other longitudinal modes have amplitudes which progressively decrease as the difference between them and the main frequency increases. For a laser with a reasonably high quality factor (Q), only the two modes which are adjacently higher and lower in frequency relative to the main mode have amplitudes which are high enough to cause problems in many practical applications.

The longitudinal modes in a laser are separated from each other by a predetermined increment $\Delta f = c/2l$, where c is the local speed of light in the laser medium, and l is the length of the resonant cavity in the laser. For a typical Nd:Yag laser having a cavity length $l=1.5$ m, operating at a wavelength of 1.06 microns ($2.82 \times 10^{14}$ Hz), $\Delta f$ will be on the order of 100 MHz. The longitudinal mode frequency on each side of the main mode frequency will interactively combine with the main mode frequency to generate a beat frequency equal to the difference therebetween, which is 100 MHz. Thus, the presence of a 100 MHz beat frequency component in the composite pulse generated by the laser indicates MLM operation, whereas the absence of a 100 MHz component indicates SLM operation. Other beat frequency components may be present, however, their amplitudes will be substantially lower than that of the 100 MHz component. Detection of only one beat frequency component is generally sufficient to discriminate MLM operation from SLM operation.

Although a preferred application of the present invention relates to the discrimination of MLM from SLM operation, the invention is not so limited. It is within the scope of the invention to discriminate operation in multiple modes other than longitudinal, such as multiple transverse modes, and a combination of longitudinal and transverse modes.

Figure 1:
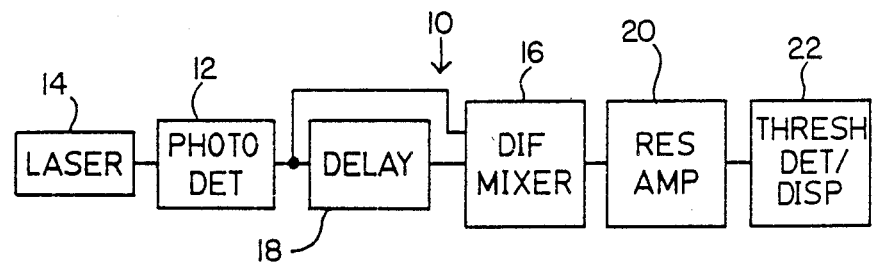
FIG. 1 is a block diagram illustrating a frequency detector embodying the present invention employed to discriminate between SLM and MLM operation of a laser.

Referring now to FIG. 1 of the drawing, a frequency detector embodying the present invention is generally designated as 10, and includes a photodetector 12 disposed to be irradiated by at least a portion of an optical beam from a laser 14. The photodetector 12 produces an electrical signal having a waveform which corresponds to the optical waveform of the laser beam. The output of the photodetector 12 is fed directly to an input of a differential mixer 16, and through a delay unit 18 to another input of the mixer 16.

The delay unit 18 is designed to produce a time delay equal to one-half the period of one cycle of the frequency which is to be detected. Where a beat frequency component of 100 MHz present in the laser beam is predetermined to indicate MLM operation, having a corresponding period of 10 ns, the delay unit 18 is designed to produce a delay of one-half the period of the beat component, or 5 ns. It will be noted that the delay may be 1.5 periods, 2.5 periods, etc., as long as the phase of the beat frequency component in the output signal of the delay unit 18 is 180° out of phase with the beat frequency component in the input signal. However, delaying the input signal by more one-half cycle will degrade the performance of the circuit by decreasing the amount by which the laser pulse profile is suppressed.

If a delay is inherent in the direct circuit path from the photodetector 12 to the mixer 16, or if a delay is introduced into this circuit path for any reason, the delay period of the delay unit 18 may be increased by the same amount so that the beat frequency components of the two signals at the inputs of the mixer 16 are 180° out of phase with each other. It is further within the scope of the invention to replace the delay unit 18 with any type of phase shifting means which causes the beat frequency components of the two signals at the inputs of the mixer 16 to be 180° out of phase with each other for subtractive combination by the mixer 16.

The differential mixer 16 produces a signal which has the main waveform shape or profile of the laser beam pulse suppressed, and with the 100 MHz beat frequency component amplified. All other frequency components which differ substantially from the beat frequency are also suppressed. The mixer 16 produces an output signal which is further amplified by a resonant amplifier 20, and fed to a threshold detector/display unit 22. As will be described in detail below, the unit 22 includes an integrator which produces a DC output having a magnitude corresponding to the peak amplitude of the beat frequency (if present). The unit 22 further includes a comparator which compares the integrator output with a predetermined threshold value which is selected to discriminate MLM from SLM, and produces a detector signal output which may activate a display unit such as a lamp when the integrator output is above the threshold value.

Figure 2:
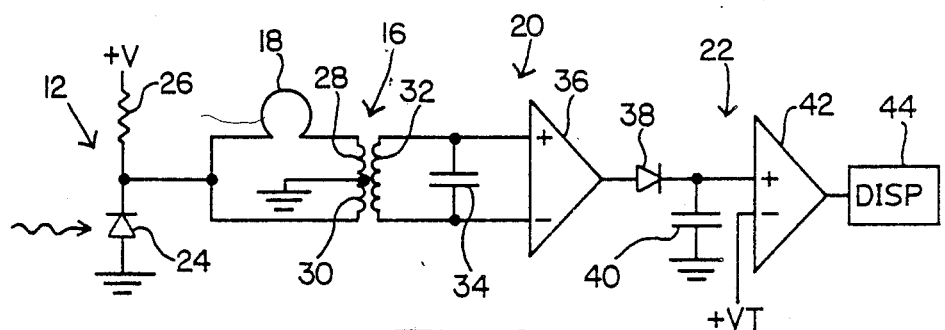
FIG. 2 is an electrical schematic diagram of a basic embodiment of the present detector.

The present detector 10 is illustrated in more detail in FIG. 2. The photodetector 12 includes a photodiode 24 having an anode connected to ground, and a cathode connected to a positive voltage source +V through a resistor 26. The output signal from the photodetector 12 is produced, upon irradiation by the beam from the laser 14, at the junction of the photodiode 24 and resistor 26. The delay unit 18 may be embodied simply as a piece of wire or other material, having a length selected such that propagation of an electrical signal therethrough takes 5 ns longer than propagation of the signal directly through the undelayed circuit path to the mixer 16.

The differential mixer 16 includes two symmetrical mixing coils 28 and 30, which each have one end connected to ground. The other end of the coil 28 is connected receive the output signal from the delay unit 18, whereas the other end of the coil 30 is connected to receive the undelayed output signal from the photodetector 12.

The coils 28 and 30 are wound around a common cylindrical form and have an equal number of turns. However, the coils 28 and 30 are wound in opposite directions, thereby carrying current in opposite directions, and are inductively coupled together so as to produce a magnetic field which is proportional to the difference between the two input currents. This magnetic field induces current in another coil 32, which is connected in parallel with a capacitor 34 to constitute a parallel resonant circuit. The inductance of the coil 32 and the capacitance of the capacitor 34 are selected to produce resonance at 100 MHz. The differential mixer 16 is constituted by the coils 28, 30, and 32.

The differential inputs of an RF operational amplifier 36 are connected across the capacitor 34 to amplify the signal thereacross. The resonant amplifier 20 is constituted by the resonant circuit including the coil 32 and capacitor 34, in combination with the operational amplifier 36. The coil 32 serves the dual function of inductively coupling out the differential signal produced by the coils 28 and 30, and producing resonance in combination with the capacitor 34. The purpose of the resonant circuit is to increase the selectivity of the detector to the beat frequency, and provide additional amplification thereof. The resonance frequency F of the circuit depends on the inductance L of the coil 32 and the capacitance C of the capacitor 34, in accordance with the formula $F = 1/(2\pi(LC)^{\frac{1}{2}})$. The selectivity of the resonant circuit depends on the quality factor (Q) thereof. Assuming an exemplary case in which the laser pulse duration is 50 ns and the beat frequency is 100 MHz, five 100 MHz beats can occur within the duration of one pulse. In this case, optimal selectivity is obtained with the Q of the circuit selected to be 5. The resonant circuit may be omitted if the differential mixer has sufficient selectivity and gain. The amplifier 36 may be omitted if the signal across the resonant circuit has sufficient amplitude, and if the threshold detector unit 22 has sufficiently high input impedance.

The integrator of the unit 22 includes a diode 38, the anode of which is connected to the output of the operational amplifier 36. The cathode of the diode 38 is connected to ground through an integrating capacitor 40. The output signal from the amplifier 36 is half-wave rectified by the diode 38, and integrated by the capacitor 40 to produce a generally DC signal having a magnitude or voltage corresponding to the peak value or other predetermined function of the AC output signal from the amplifier 36. The junction of the diode 38 and capacitor 40, which constitutes the output of the integrator, is applied to a positive input of an operational amplifier 42. A threshold voltage +VT is applied to the negative input of the amplifier 42, such that the amplifier 42 constitutes the comparator of the unit 22. More specifically, the amplifier 42 produces the detector output as a logically high signal when the voltage across the capacitor 40 is above the threshold voltage +VT, and vice-versa. The voltage +VT corresponds to the predetermined threshold value discussed above, which is selected to discriminate MLM from SLM operation of the laser 14. The logically high detector output activates a display 44, which may be lamp or the like, to indicate the generation of a MLM pulse by the laser 14.

Figure 3A:
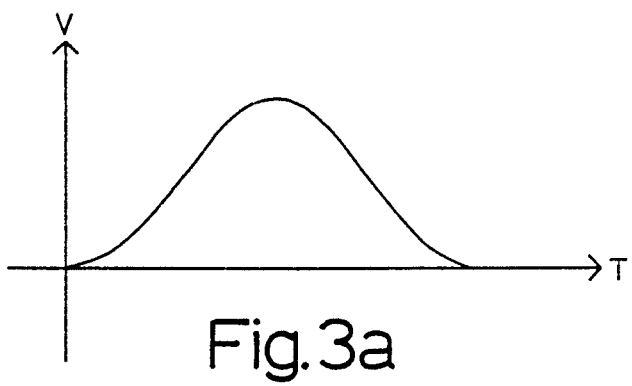
FIGS. 3a to 3d are graphs illustrating electrical signals generated by the detector in response to SLM operation of the laser.
Figure 3B:
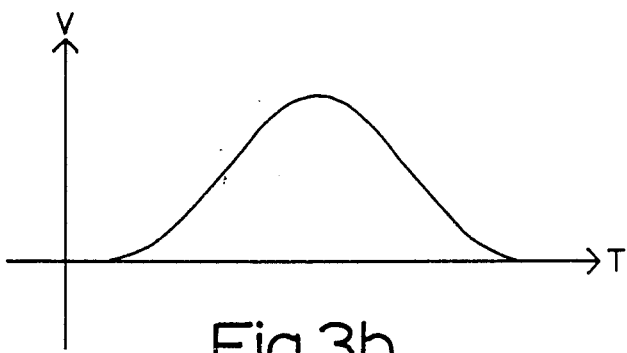
Figure 3C:
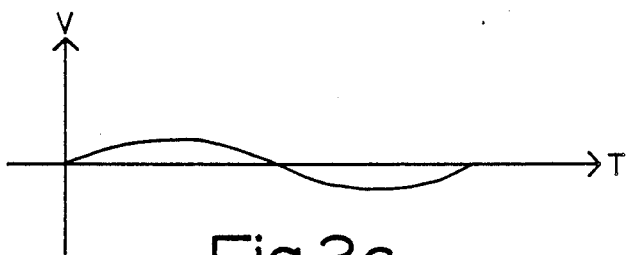

The operation of the present invention may be better understood with reference being made to FIGS. 3a to 3d, and FIGS. 4a to 4d, of the drawing, in which the horizontal axes represent time T and the vertical axes represent voltage V. FIG. 3a illustrates the output of the photodetector 12 in response to a SLM laser pulse. The waveform has a smooth, Gaussian profile. FIG. 3b illustrates the laser pulse after delay by the unit 18. The shape is the same, and the waveform has merely been shifted in time. FIG. 3c illustrates the output signal from the differential mixer 16. The waveform is generally flat, but has significant positive and negative portions corresponding to the leading and trailing non-overlapped areas of the signals appearing at the inputs of the mixer 16.

Figure 3D:
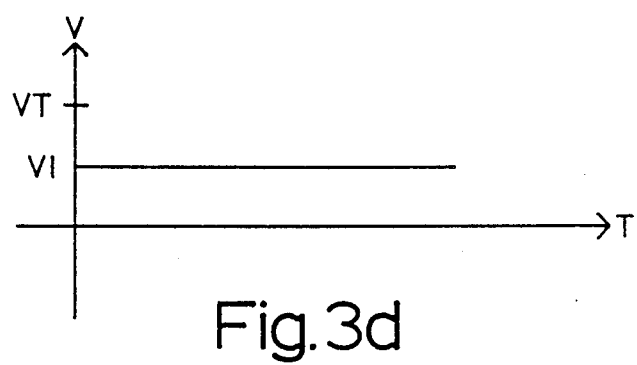

FIG. 3d illustrates the output signal from the integrator of the unit 22, which appears at the junction of the diode 38 and capacitor 40. The signal is generally DC, and has a magnitude or voltage V1 produced by integration of the rectified high frequency SLM component in the laser beam, which in this case is the only component. The SLM component is attenuated to a large extent by the resonant circuit, but a residual portion thereof may remain to produce a non-zero value of V1. The threshold value +VT is selected to be above the value V1, such that the amplifier 42 does not produce the detector output in response to the voltage V1 at the input thereof.

FIGS. 4a to 4d correspond to FIGS. 3a to 3d respectively, but illustrate the case of an MLM pulse generated by the laser 14. The direct and delayed output signals from the photodetector 12 shown in FIGS. 4a and 4b respectively have the same shape, which includes the main Gaussian profile of the laser pulse with a 100 MHz beat frequency component superposed thereon. FIG. 3c illustrates the output signal from the differential mixer 16. It will be seen that the main shape of the pulse is suppressed as in the case of the SLM pulse, but the 100 MHz beat frequency component is increased in amplitude. This is due to the half-cycle shift between the input signals to the mixer 16, and the subtractive combination thereof, resulting in the inverted positive half-cycle portions of the delayed signal being added to the negative half-cycle portions of the undelayed signal, and vice-versa. The amplitude increase is proportional to the coupling factor between the coils 28,30, and the coil 32, resulting in doubling of the amplitude for the case of 100% coupling.

Figure 4A:
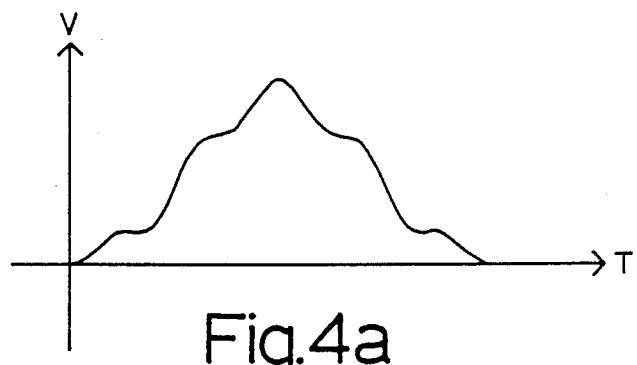
FIGS. 4a to 4d are similar to FIGS. 3a to 3d, but illustrate MLM operation of the detector.
Figure 4B:
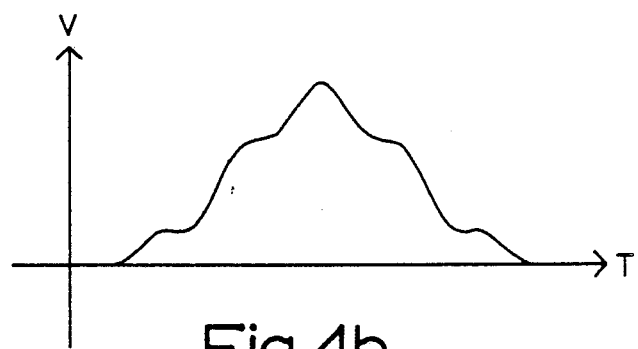
Figure 4C:
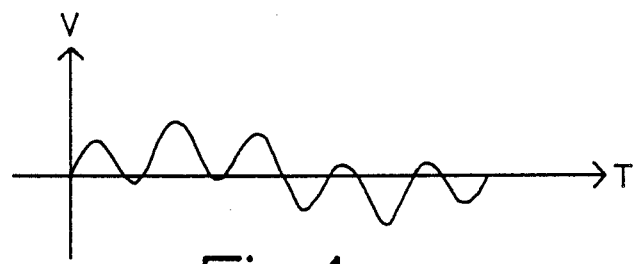
Figure 4D:
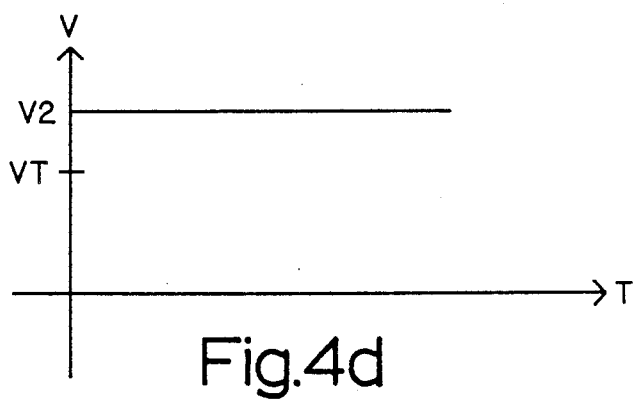

FIG. 4d illustrates the output voltage across the capacitor 40, which is generally DC and has a value V2 which is higher than the threshold value +VT. The voltage V2 causes the amplifier 42 to produce the detection output which activates the display 44. The voltage V2 is higher than V1 because the rectified beat frequency component is added to the rectified high frequency SLM component.

Figure 5:
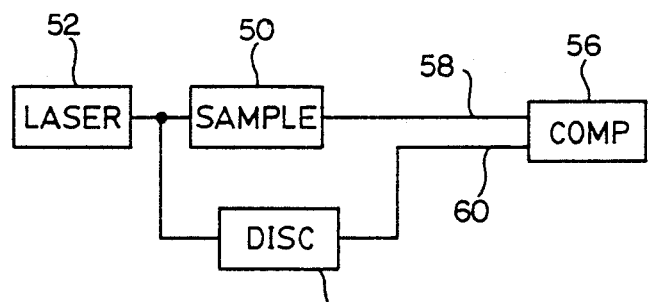
FIG. 5 is a block diagram illustrating an exemplary application of the invention used for scientific research.

FIG. 5 illustrates an embodiment of the present invention which overcomes the problems discussed above relating to scientific research of the effect of laser irradiation on a material. A sample 50 of the material is irradiated by a beam from a laser 52. The laser 52 is arranged so that a portion of the beam is directed to a detector or discriminator 54 of the invention. A computer 56 or other recording device has a first data input channel 58 arranged to receive signals from a sensor (not shown) corresponding to readings produced by irradiation of the sample by pulses from the laser 52. The detector 54 is essentially the same as illustrated in FIG. 2, but is adapted to apply the output signal from the amplifier 42 to a second data input channel 60 of the computer 56. The channels 58 and 60 may be any known type of analog or digital data input channels. The computer 56 may be provided with clock or other timing circuitry (not shown) which causes data from the channels 58 and 60 to be input into a storage means (not shown) in the computer 56 in the form of pairs. Each data pair consists of a first data corresponding to the sensed reading from the sample 50, and a second data (logically high or low) from the discriminator 54 indicating whether the pulse which produced the respective first data was SLM or MLM. As an alternative, the output from the discriminator 54 may be used as a gate signal for the first data input channel 58, allowing only data produced by SLM pulses to be input to the computer 56.

Figure 6:
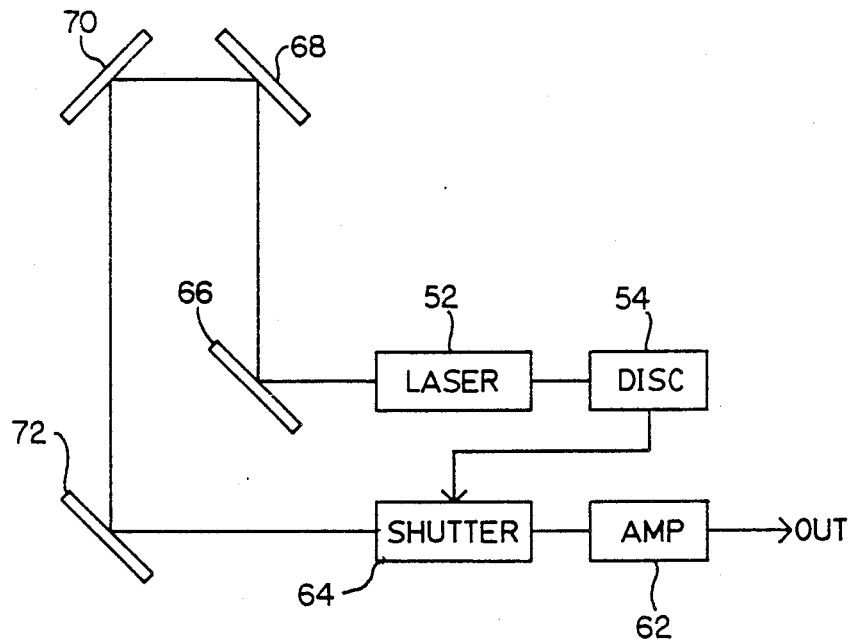
FIG. 6 is a block diagram illustrating the present frequency detector employed as a protection device for a laser amplifier.

FIG. 6 illustrates the present invention employed for protection of a receiver means which is exposed to radiation from a laser, and which might be damaged by MLM pulses. In this case, the laser 52 directs its beam into a power amplifier 62, which increases the power of the beam and produces an output for a desired application. A portion of the beam from the laser 52, in this example constituted by leakage out the back side of the laser cavity, is directed to the discriminator 54. The output of the discriminator 54 is connected to a control input of an electro-optic shutter 64 disposed between the laser 52 and amplifier 62. The shutter 64 is normally open, allowing the laser beam to pass therethrough. However, the detection output from the discriminator 54, indicating the generation of a MLM pulse by the laser 52, causes the shutter 64 to close, thereby preventing the MLM pulse from reaching the amplifier 62 and causing damage to the same.

Electro-optic shutters are known in the art per se, and typically include a polarizer in combination with a birefringent crystal material. The laser beam is polarized to a selected polarity by the polarizer before reaching the crystal. The crystal is designed to be unpolarized, or to have the same polarization as the polarizer in the absence of an electrical field. Application of an electrical field, in this case in response to the detection signal, causes the crystal to be polarized to a different polarity from that of the polarizer, thereby preventing the laser beam from passing therethrough. Although an electro-optic shutter is preferred for used in the present invention due to its high speed of operation, any shutter which is capable of blocking an optical beam in response to an applied electrical signal in an acceptably short period of time may be used within the scope of the present invention.

In order for the embodiment of FIG. 6 to be operative, the length of time required for the laser pulse to travel from the laser 52 to the shutter 64 must be longer than the length of time required by the discriminator 54 to close the shutter 64 in response to a detected MLM pulse. This may be accomplished by placing the discriminator 54 and shutter 64 relatively close to the laser 52, and providing an optical delay path between the laser 52 and shutter 64. The optical delay path may be created by reflectors 66, 68, 70, and 72, which cause the laser beam to travel a relatively long total distance in a path between the laser 52 and shutter 64. The optical delay period is proportional to the length of the delay path.

EXAMPLE

Figure 7:
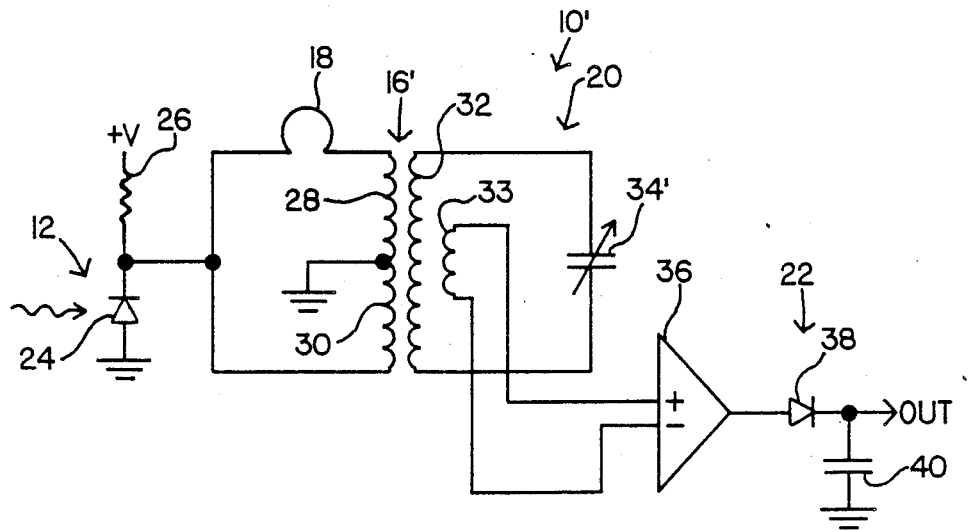
FIG. 7 is an electrical schematic diagram illustrating a modified example of the present frequency detector.

FIG. 7 illustrates a detailed example of the present invention including a slightly modified differential mixer. Like elements are designated by the same reference numerals used in FIG. 2, whereas similar but modified elements are designated by the same reference numerals primed.

The differential mixer 16' includes the symmetrical, oppositely wound mixing coils 28 and 30, as well as the inductively coupled coil 32 which is combined with the capacitor 34' to constitute the resonant circuit. The mixer 16' further comprises a coupling coil 33, which inductively couples the output of the resonant circuit to the amplifier 36. It will be noted that the inputs to the amplifier 36 are directly connected across the capacitor 34' in the embodiment of FIG. 2. The arrangement of FIG. 6 provides isolation of the resonant circuit from the amplifier 36, thereby preventing loading thereof.

The differential mixer 16' was constructed by providing a ½" diameter nylon rod which had screw threads cut into the surface thereof at a pitch of 13 turns/inch to serve as a form for the coil wires and to keep them evenly spaced. The coil 33 was constituted by two turns of wire wrapped around the central portion of the form. The coils 28 and 30 were each constituted by two turns of wire wrapped around the form on opposite sides of the coil 33, and separated therefrom by approximately two threads. The coils 28 and 30 were connected so that the input currents flowed therethrough in opposite directions. The coil 32 was constituted by six turns of wire wrapped on top of the coil 33, through the intermediary of an insulative layer.

The capacitor 34' was a 15 pf variable unit. The inductance of the coil 32, which was connected in circuit with the capacitor 34' to constitute the parallel resonant circuit, was approximately 0.34 mH. With the capacitor adjusted to the center of its range at 7.5 pf, the resonant frequency of the circuit was tuned to 100 MHz.

While several illustrative embodiments of the invention have been shown and described, numerous variations and alternate embodiments will occur to those skilled in the art, without departing from the spirit and scope of the invention. For example, although the invention has been described as being especially suited for use with a pulsed laser, it may find utility in applications involving continuous lasers as well. Accordingly, it is intended that the present invention not be limited solely to the specifically described illustrative embodiments. Various modifications are contemplated and can be made without departing from the spirit and scope of the invention as defined by the appended claims.

I claim:

1. A frequency detector for detecting a predetermined frequency component in an input signal, comprising:

phase shifting means for shifting the phase of the input signal to produce an output signal in which the predetermined frequency component is out of phase with the predetermined frequency component in the input signal by substantially 180°;

differential mixer means for subtractively combining the input signal with the output signal from the phase shifting means;

integrator means for producing an output signal having a magnitude which varies in accordance with a value of an output signal from the differential mixer means; and comparator means for producing a detection signal in response to an output signal from the integrator means which corresponds to presence in the input signal of the predetermined frequency component having a magnitude higher than a predetermined value.

2. A frequency detector as in claim 1, in which the phase shifting means comprises delay means for delaying the input signal by a period equal to one-half of one cycle of the predetermined frequency component.

3. A frequency detector as in claim 2, further comprising resonator means constructed to resonate at said predetermined frequency, the resonator means being connected in circuit between the differential mixer means and the integrator means.

4. A frequency detector as in claim 3, further comprising amplifier means connected in circuit between the resonator means and the integrator means.

5. A frequency detector as in claim 2, in which the differential mixer means comprises two symmetrical, inductively coupled mixer coils which are connected in circuit to receive the input signal and the output signal from the delay means respectively.

6. A frequency detector as in claim 5, further comprising:
resonator means connected in circuit between the differential mixer means and the integrator means;
the resonator means including a resonator coil which is inductively coupled to the two mixer coils, and a capacitor connected in circuit with the resonator coil to resonate therewith at said predetermined frequency.

7. A frequency detector as in claim 2, further comprising optical shutter means constructed to be normally open, and to close in response to the detection signal.

8. A frequency detector as in claim 1, in which the integrator means is constructed to produce said output signal having said magnitude thereof which varies in accordance with a peak value of said output signal from the differential mixer means.

9. A discriminator for discriminating between single mode and multi-mode operation of a laser, comprising:
photodetector means for producing an output signal in response to irradiation by the optical beam from the laser;
phase shifting means for shifting the phase of the output signal from the photodetector means to produce an output signal in which a beat frequency component is out of phase with a beat frequency component in the output signal from the photodetector means by substantially 180°;
the beat frequency component being generated by interaction of two frequency components in the optical beam corresponding to two predetermined modes of operation of the laser respectively;
differential mixer means for subtractively combining the output signal from the photodetector means with the output signal from the phase shifting means;
integrator means for producing an output signal having a magnitude which varies in correspondence with a value of an output signal from the differential mixer means; and
comparator means for producing a detection signal in response to an output signal from the integrator means which corresponds to presence of the beat frequency component having a magnitude higher than a predetermined value and thereby multi-mode operation of the laser.

10. A discriminator as in claim 9, in which the phase shifting means comprises delay means for delaying the output signal from the photodetector means by a period equal to one-half of one cycle of the beat frequency component.

11. A discriminator as in claim 10, further comprising resonator means constructed to resonate at said beat frequency, the resonator means being connected in circuit between the differential mixer means and the integrator means.

12. A discriminator as in claim 11, further comprising amplifier means connected in circuit between the resonator means and the integrator means.

13. A discriminator as in claim 10, in which the differential mixer means comprises two symmetrical, inductively coupled mixer coils which are connected in circuit to receive the output signal from the photodetector means and the output signal from the delay means respectively.

14. A discriminator as in claim 13, further comprising:
resonator means connected in circuit between the differential mixer means and the integrator means;
the resonator means including a resonator coil which is inductively coupled to the two mixer coils, and a capacitor connected in circuit with the resonator coil to resonate therewith at said beat frequency.

15. A discriminator as in claim 10, further comprising electro-optical shutter means constructed to be normally open, and to close and block the optical beam from the laser in response to the detection signal from the comparator means.

16. A discriminator as in claim 9, in which the integrator means is constructed to produce said output signal having said magnitude thereof which varies in accordance with a peak value of said output signal from the differential mixer means.

17. In an apparatus including a laser, and a receiver means for receiving an optical beam from the laser, a discriminator for preventing the optical beam from reaching the receiving means when the laser is in multi-mode operation, comprising:
detector means for detecting multi-mode operation of the laser and producing a detection signal in response thereto; and
electro-optical shutter means disposed between the laser and the receiving means, the shutter means being constructed to be normally open, and to close and block the optical beam from the laser in response to the detection signal from the detector means.

18. An apparatus as in claim 17, in which the detector means comprises:
photodetector means for producing an output signal in response to irradiation by the optical beam from the laser;
phase shifting means for shifting the phase of the output signal from the photodetector means to produce an output signal in which a beat frequency component is out of phase with a beat frequency component in the output signal from the photodetector means by substantially 180°;
the beat frequency component being generated by interaction of two frequency components in the optical beam corresponding to two predetermined modes of operation of the laser respectively;

differential mixer means for subtractively combining the output signal from the photodetector means with the output signal from the phase shifting means;

integrator means for producing an output signal having a magnitude which varies in accordance with a value of an output signal from the differential mixer means; and comparator means for producing the detection signal in response to an output signal from the integrator means having a magnitude which corresponds to presence of the beat frequency component having a magnitude higher than a predetermined value and thereby multi-mode operation of the laser.

19. An apparatus as in claim 18, in which the phase shifting means comprises delay means for delaying the output signal from the photodetector means by a period equal to one-half of one cycle of the beat frequency component.

20. An apparatus as in claim 19, in which the detector means further comprises resonator means constructed to resonate at said beat frequency, the resonator means being connected in circuit between the differential mixer means and the integrator means.

21. An apparatus as in claim 20, in which the detector means further comprises amplifier means connected in circuit between the resonator means and the integrator means.

22. An apparatus as in claim 19, in which the differential mixer means comprises two symmetrical, inductively coupled mixer coils which are connected in circuit to receive the output signal from the photodetector means and the output signal from the delay means respectively.

23. An apparatus as in claim 19, in which the detector means further comprises:
resonator means connected in circuit between the differential mixer means and the integrator means;
the resonator means including a resonator coil which is inductively coupled to the two mixer coils, and a capacitor connected in circuit with the resonator coil to resonate therewith at said beat frequency.

24. An apparatus as in claim 17, further comprising optical delay means disposed between the laser and the receiver means, the delay means delaying the optical beam from the laser for a period of time which is greater than a length of time required for the discriminator to close the optical shutter means in response to detected multi-mode operation of the laser.

25. An apparatus as in claim 24, in which the optical delay means comprises a plurality of reflectors.

26. An apparatus as in claim 18, in which the integrator means is constructed to produce said output signal having said magnitude thereof which varies in accordance with a peak value of said output signal from the differential mixer means.

27. In an apparatus including a laser, recording means having first data channel means for receiving a sensor signal in response to irradiation of a material by an optical beam from the laser, and second data channel means, a discriminator for discriminating between single and multi-mode operation of the laser, the discriminator comprising:

photodetector means for producing an output signal in response to irradiation by the optical beam from the laser;

phase shifting means for shifting the phase of the output signal from the photodetector means to produce an output signal in which a beat frequency component is out of phase with a beat frequency component in the output signal from the photodetector means by substantially 180°;

the beat frequency component being generated by interaction of two frequency components in the optical beam corresponding to two predetermined modes of operation of the laser respectively;

differential mixer means for subtractively combining the output signal from the photodetector means with the output signal from the phase shifting means;

integrator means for producing an output signal having a magnitude which varies in accordance with a value of an output signal from the differential mixer means; and comparator means for producing a detection signal in response to an output signal from the integrator means having a magnitude which corresponds to presence of the beat frequency component having a magnitude higher than a predetermined value and thereby multi-mode operation of the laser, the comparator means applying the detection signal to the second data channel means of the recording means.

28. A discriminator as in claim 27, in which the phase shifting means comprises delay means for delaying the output signal from the photodetector means by a period equal one-half of one cycle of said beat frequency component.

29. A discriminator as in claim 28, further comprising resonator means constructed to resonate at said beat frequency, the resonator means being connected in circuit between the differential mixer means and the integrator means.

30. A discriminator as in claim 29, further comprising amplifier means connected in circuit between the resonator means and the integrator means.

31. A discriminator as in claim 28, in which the differential mixer means comprises two symmetrical, inductively coupled mixer coils which are connected in circuit to receive the output signal from the photodetector means and the output signal from the delay means respectively.

32. A discriminator as in claim 31, further comprising:
resonator means connected in circuit between the differential mixer means and the integrator means;
the resonator means including a resonator coil which is inductively coupled to the two mixer coils, and a capacitor connected in circuit with the resonator coil to resonate therewith at said beat frequency.

33. A discriminator as in claim 27, in which the integrator means is constructed to produce said output signal having said magnitude thereof which varies in accordance with a peak value of said output signal from the differential mixer means.

* * * * *